United States Patent [19]

Gröger et al.

[11] Patent Number: 4,832,664
[45] Date of Patent: May 23, 1989

[54] GUIDE RAIL FOR DRIVE CHAINS

[75] Inventors: Klaus Gröger, Hemmingen; Walter Mittermeier, Tamm; Robert Binder, Schwieberdigen; Volker Diehm, Schwaigern, all of Fed. Rep. of Germany

[73] Assignee: Dr. Ing. h.c.F. Porsche AG, Fed. Rep. of Germany

[21] Appl. No.: 161,105

[22] Filed: Feb. 26, 1988

[30] Foreign Application Priority Data

Feb. 26, 1987 [DE] Fed. Rep. of Germany ....... 3706136

[51] Int. Cl.4 .............................. F16H 7/08; F16H 7/18
[52] U.S. Cl. ................................. 474/111; 123/90.15; 264/255; 474/140
[58] Field of Search ............... 474/140, 101, 109, 111, 474/133, 136; 264/255, 250, 241; 123/90.31, 90.27, 90.15

[56] References Cited

U.S. PATENT DOCUMENTS

| 4,472,161 | 9/1984 | Ojima | 474/140 X |
| 4,480,603 | 11/1984 | Tsuboi | 474/111 X |
| 4,530,681 | 7/1985 | Kurata et al. | 474/140 X |
| 4,713,043 | 12/1987 | Biedermann | 474/111 |

FOREIGN PATENT DOCUMENTS

| 1245672 | 7/1967 | Fed. Rep. of Germany . |
| 1750684 | 2/1971 | Fed. Rep. of Germany . |
| 1750685 | 2/1971 | Fed. Rep. of Germany . |
| 3049106 | 7/1982 | Fed. Rep. of Germany . |
| 3506010 | 8/1986 | Fed. Rep. of Germany . |
| 3417100 | 11/1986 | Fed. Rep. of Germany . |
| 3525746 | 1/1987 | Fed. Rep. of Germany . |
| 1408575 | 7/1965 | France . |
| 484128 | 5/1938 | United Kingdom . |

Primary Examiner—Thuy M. Bui
Attorney, Agent, or Firm—Barnes & Thornburg

[57] ABSTRACT

A guide rail, and method of making same, for the guiding and/or tightening of chains that are used in internal-combustion engines, for example, for driving camshafts, auxiliaries or the like is disclosed. For reasons concerning weight and manufacturing, the guide rail consists of a plastic material and is formed by a slideway lining body and a carrier. Both the carrier and the slideway lining body are produced in a progressive manufacturing cycle and are interconnected via one or several dovetailed connections.

21 Claims, 3 Drawing Sheets

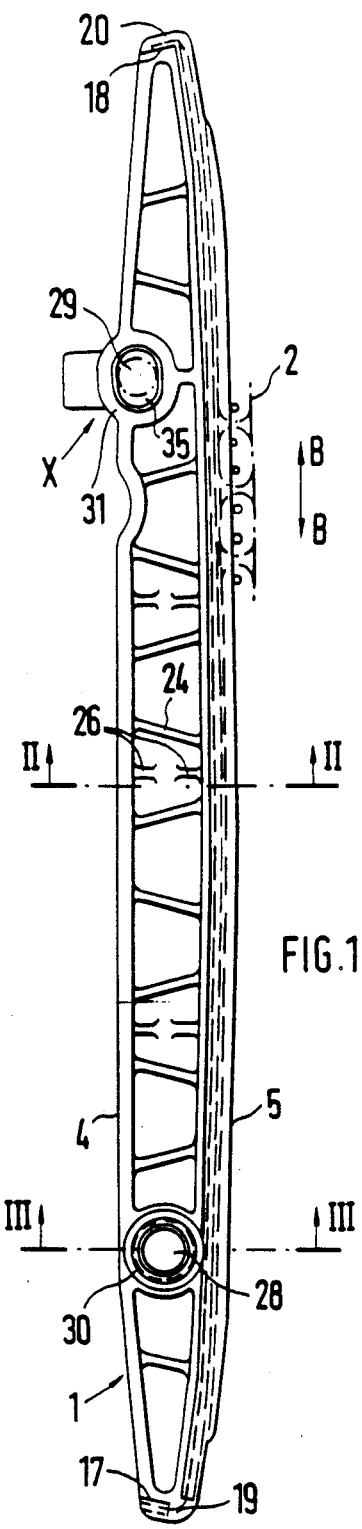
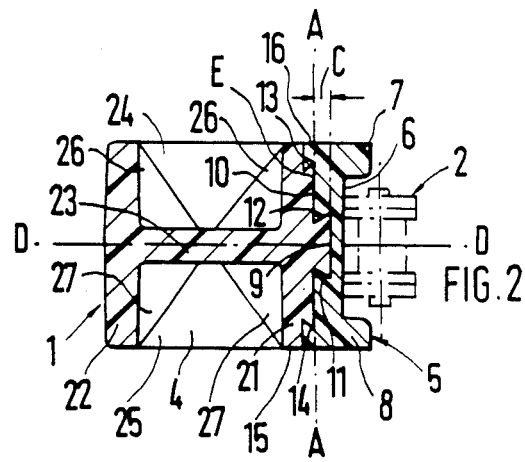
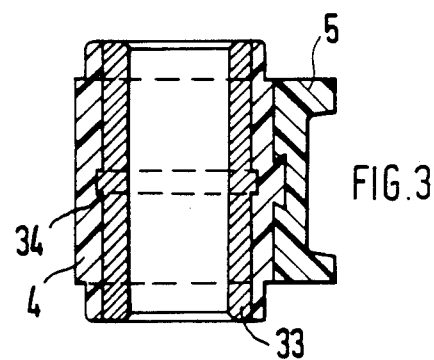
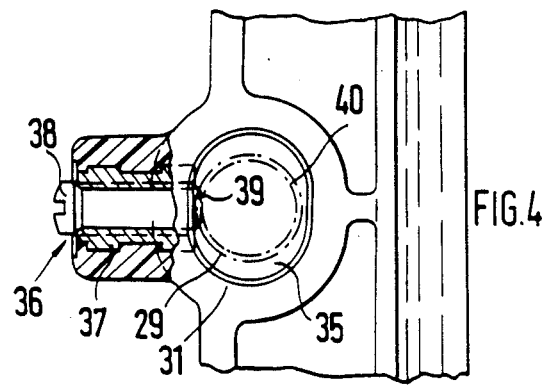

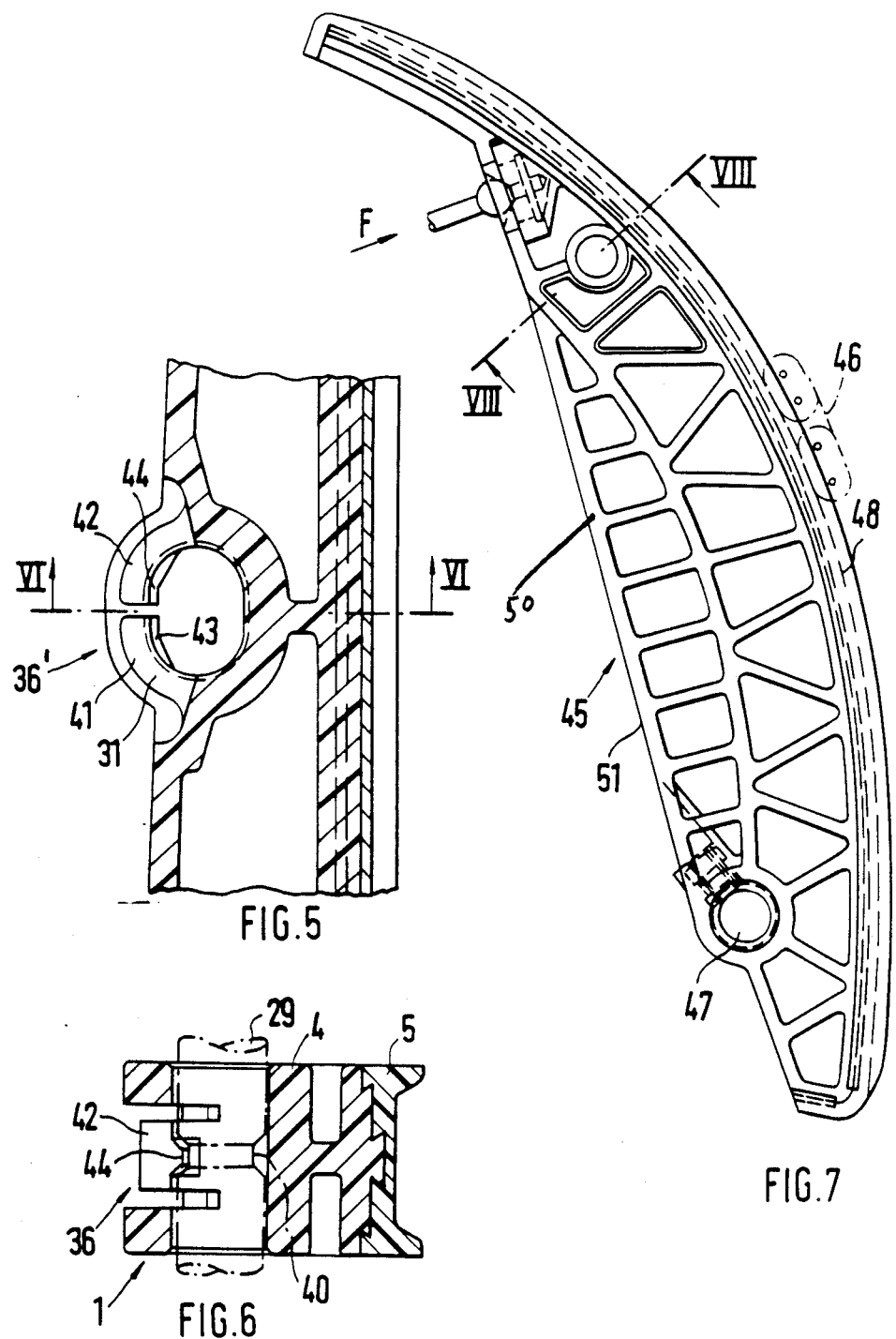

GUIDE RAIL FOR DRIVE CHAINS

BACKGROUND AND SUMMARY OF THE INVENTION

The invention relates to a guide rail for guiding and or tightening drive chains. Especially preferred embodiments of the invention relate to guide rails for chains of a control shaft drive of a vehicle internal combustion engine.

In French Pat. No. (FR-PS) 1 408 575, a chain guide rail is described formed of plastic and has a T-shaped cross-section.

German-Published Unexamined patent application No. (DE-OS) 30 49 106 shows a tightening rail for chain drives comprising a carrier made of sheet metal and a slideway lining body that consists of plastic and surrounds this carrier. The carrier and the slideway lining body are components that are produced independently of one another and interact via locking devices.

Finally, German Pat. No. (DE-PS) 34 17 100 shows a guide rail having a hollow duct housing that surrounds a chain on all sides. This guide rail is formed of plastic.

It is an object of the invention to provide a guide rail for the guiding and/or tightening of chains that, although it is relatively light, can withstand high strains and can be manufactured in a cost-effective manner.

According to the invention, this objective is achieved by providing that the guide rail is made up of a carrier made of a first plastic material and a slideway lining body made of a second different plastic material in a successive manufacturing opertion with said carrier and slideway lining body interengageably connected to one another along their length. Especially preferred embodiments form the carrier and slideway lining body by successive extrusion molding steps and interconnect the same by dovetailed connections. Certain preferred embodiments include reinforcing webs for the carrier and a double -T- flange carrier construction which minimizes weight while optimizing strength of the carrier. In certain especially preferred embodiments, the carrier is provided with bearing lugs for accommodating bearing pin connections at an internal combustion engine. The material of the slideway lining body is selected to optimize sliding bearing characteristics vis-a-vis the chain guided directly thereon and the material of the carrier is selected to optimize the carrying support functions while minimizing weight.

Principle advantages achieved by means of the invention are that the guide rail is of a light weight and nevertheless durably withstands the strains caused by the chain. In addition, the manufacturing method of the guide rail is economical because of the progressive manufacturing sequence-machining processes are essentially unnecessary. The construction also meets above-average requirements with respect to quality.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic lateral view of a guide rail constructed in accordance with a first preferred embodiment of the invention;

FIG. 2 is an enlarged sectional view taken along Line II—II of FIG. 1;

FIG. 3 is an enlarged sectional view taken along Line III—III of FIG. 1;

FIG. 4 is an enlarged detail X of FIG. 1;

FIG. 5 is a view corresponding to FIG. 4, showing another embodiment of the invention;

FIG. 6 is a sectional view taken along Line VI—VI of FIG. 5;

FIG. 7 is a view corresponding to FIG. 1, showing another embodiment of the invention;

DETAILED DESCRIPTION OF THE DRAWINGS

Figure 8:
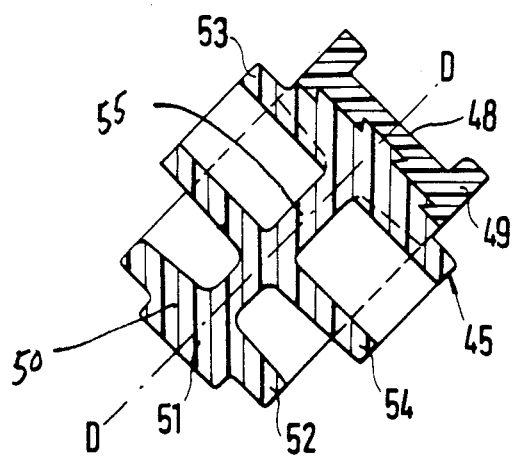
FIG. 8 is an enlarged view taken along Line VIII—VIII of FIG. 7.

FIG. 1 shows a guide rail 1 that is used for guiding a chain 2. This chain 2 may, for example, be an endless link of a chain drive. The latter may be a component of an internal-combustion engine that is not shown and in the case of this internal-combustion engine act between the crankshaft and the control shaft that is also called the camshaft.

The guide rail 1 is formed by a carrier 4 and a slideway lining body 5, the chain 2 sliding along this slideway lining body 5.

The carrier 4 and the slideway lining body 5 consist respectively of a plastic material of respectively different material specifications, preferably polyamide, polyamide with fiber glass additions being used for the carrier 4. Wear-resistant polyamide without fiber glass additions is used for the slideway lining body 5.

The slideway lining body 5 has a sliding surface 6 for the chain 2 that is delimited by the shoulders 7, 8 in such a way that it has a U-shaped contour.

The carrier 4 and the slideway lining body 5 are fitted together in a plane A—A. Between these components forming a unit, interengaging meshing arrangements are provided that mesh with one another and reach behind one another and that, in the embodiment according to FIG. 2, are formed by two dovetailed connections 9, 10. These dovetailed connections 9, 10 extend in the moving or travel direction B—B of the chain (FIG. 1).

In cross-sectional view, the dovetailed connections 9, 10 are arranged so that they are offset in their positions with respect to one another by a distance C and exhibit profilings 11, 12 and 13, 14 that reach behind corresponding counterprofile shapes. The profilings 11, 12 of the dovetailed connection 9 are arranged adjacent to a central longitudinal plane D—D of the guide rail 1. The profilings 13, 14 of the dovetailed connection 10 are arranged adjacent to marginal zones 15, 16 of the guide rail 1.

The carrier 4 has end areas 17, 18 (FIG. 1) that are bent or curved with respect to the moving direction B—B of the chain. The bent areas 19, 20 of the slideway lining body 5 are pulled or extend around the end areas 17, 18. Dovetailed connections corresponding to FIG. 2 are provided also between these end areas 17, 18 and the bent areas 19, 20.

In cross-sectional view (FIG. 2), the carrier 4 has spaced transverse flanges 21, 22 that are connected with a web 23 that extends in a central longitudinal plane D—D of the guide rail 1. This development gives the carrier 4 the shape of a double T.

Laterally of the web 23, several transverse ribs 24, 25 are provided that are arranged at a distance from one another, extend between the transverse flanges 21, 22 and are aligned vertically and/or at a sloped angle with respect to the moving direction B—B of the chain. In addition, the transverse flanges 21, 22 may also be supported by means of nodal elements 26, 27 with respect to the web 23 according to especially preferred embodiments. These elements also extend transversely to the moving direction of the chain.

The holding of the guide rail 1 takes place at bearing pins 28, 29 of the internal-combustion engine that receive bearing lugs 30, 31. Into the bearing lug 30, a metallic bush 33 is inserted (FIG. 3) that is secured at the carrier 4 by means of a collar 34. The bearing lug 31 is provided with a type of slotted bore 35, whereby thermal expansions of the guide rail 1, specifically between bearing pins 28, 29 are compensated.

Between the guide rail 1 and the bearing pin 29, a fixing device 36 is provided (FIG. 4). This fixing device 36 is formed by a metallic threaded bush 37 and a threaded bolt 38 that rests in it and that, with a spherical segment 39, engages in a groove-type recess 40 of the bearing pin 29, whereby the guide rail 1 is axially secured.

According to FIGS. 5 and 6, the fixing device 36 is formed by elastic tightening elements 41, 42 that are made in one piece with the carrier 4. The tightening elements 41, 42, project into the recess 38 of the bearing pin 29 by means of projections 43, 44.

The guide rail 1 is produced as follows: First the carrier 4 is manufactured by injection molding, namely with the pertaining dovetailed profiling along Line E (FIG. 2). Subsequently, the carrier 4 is used as a base body and the slideway lining body 5 is combined with the mentioned carrier 4 by injection molding. The carrier 4 and lining body 5 are slidably joined at their dovetailed connections.

FIG. 7 shows a guide rail 45 for tightening a chain 46. For this purpose, the chain guide rail is pivotable at 47 and is tightened by means of a device that acts in direction F and is not shown in detail. The chain tread 48 of the slideway lining body 49 has a curved course, whereas the carrier 50, with its side 51 facing away from the chain tread 48, extends with respect to it in the manner of an arc segment line. The carrier 50, between the spaced transverse flanges 52, 53, also has another transverse flange 54, in which case all tranverse flanges are connected with the web 55 extending in the central longitudinal plane D—D. In cross-sectional view, the transverse flanges 53 and 54, in this embodiment, are wider than the slideway lining body 49, whereby an additional stiffness of the guide rail 45 is achieved. Otherwise, the guide rail 45 corresponds to the construction of the guide rail 1.

Figure 10:
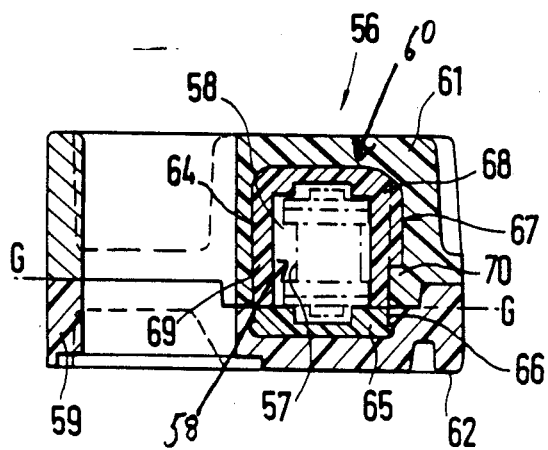
FIG. 10 is an enlarged sectional view taken along Line X—X of FIG. 9.
Figure 9:
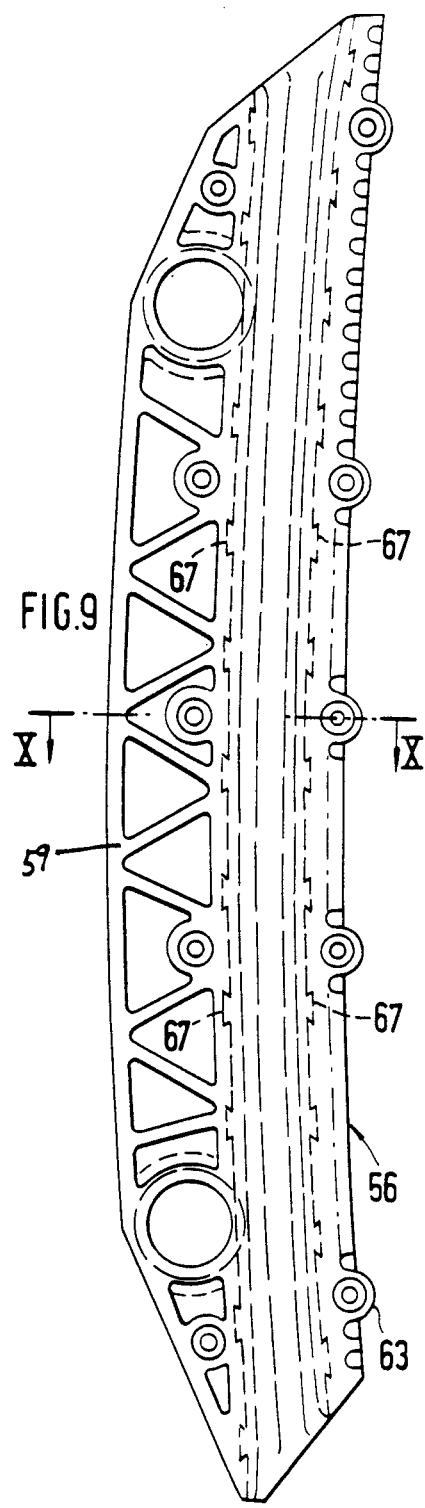
FIG. 9 is a view corresponding to FIG. 1, showing yet another embodiment of the invention.

According to FIGS. 9 and 10, the guide rail 56 is provided with a duct 58 that encloses the chain 57 on all sides, the carrier 59 and the slideway lining body 60 consisting of a receiving part 61 and a closing part 62. Both are fitted together in a longitudinal central plane G—G and are fastened by means of screws provided at 63, the receiving part 61 being provided with a U-shaped first lining body part 64 that surrounds the chain 57 on three sides, and the closing part 62 being provided with a second lining body part 65. The latter is held in the closing part 62 by means of a shoulder 66.

Between the first lining body part 64 and the receiving part 61, several dovetailed connections 67 are provided (FIG. 9) that are distributed approximately uniformly over the length of the guide rail 56 and extend transversely with respect to a longitudinal direction of the chain. The dovetailed connections 67, in this case, are mounted at both legs 68, 69 of the lining body part 64. In addition, the dovetailed connections 67 are shorter than the leg 68 to extend only over a partial area of the lining body part 64, so that the latter is fixed by means of a shoulder 70 also in transverse direction of the chain.

In the case of this guide rail, the lining body parts 64 and 65 of the slideway lining body 60 are first manufactured in separate cycles, namely by injection molding. Then the receiving part 61 and the closing part 62 of the carrier 59 are combined with the lining body parts 64 and 65 by injection molding.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A guide rail for the guiding and/or tightening of chains, preferably for a control shaft drive of an internal-combustion engine, said guide rail being formed by a carrier and a slideway lining body that consists of plastic and is connected with said carrier, wherein said carrier and said slideway lining body are manufactured of a plastic material of respective different specifications in progressive manufacturing cycles and are connected with one another via at least one meshing arrangement means that reach behind one another.

2. A guide rail according to claim 1, wherein the meshing arrangement means are dovetailed connection.

3. A guide rail according to claim 2, wherein said dovetailed connection means includes two sets of dovetailed connections between the slideway lining body and the carrier, said dovetail connections extending in the moving direction (B—B) of the chain when in an in use position slidably guided on the slideway lining body.

4. A guide rail according to claim 3, wherein the carrier has at least one end area that is bent with respect to the moving direction (B—B) of the chain, and wherein the slideway lining body is pulled around said at least one end area, via bent sections, said dovetailed connections being provided between the slideway lining body and the at least one end area.

5. A guide rail according to claim 3, wherein, in cross-sectional view of the guide rail, profilings are provided that reach behind portions of the first dovetailed connection and extend adjacent to a central longitudinal plane (D—D), and wherein profilings of the second dovetailed connection are provided which extend adjacent to marginal zones.

6. A guide rail according to claim 3, wherein, in cross-sectional view of the guide rail, the dovetailed connections are arranged offset in their position, with respect to one another.

7. A guide rail according to claim 1, wherein the carrier in cross-sectional view, has spaced transverse flanges between which a web means extends.

8. A guide rail according to claim 7, wherein another transverse flange extends between the transverse flanges.

9. A guide rail according to claim 7, wherein the transverse flanges are locally supported with respect to the web by means of nodal elements.

10. A guide rail according to claim 7, wherein the web means is arranged in a central longitudinal plane (D—D) of the guide rail.

11. A guide rail according to claim 10, wherein transverse ribs are provided laterally of the web means, that extend between the transverse flanges.

12. A guide rail according to claim 1, wherein said guide rail is formed as a duct surrounding the chain at several sides, wherein the slideway lining body is embedded in the carrier, and wherein the meshing arrangement means includes dovetailed connection means extending between the carrier and the slideway lining body transversely to a longitudinal direction of the chain.

13. A guide rail according to claim 12, wherein the dovetailed connection means are mounted at opposite legs of the slideway lining body and of the carrier.

14. A guide rail according to claim 12, wherein the dovetailed connection means extend only over a partial area of the legs of the slideway lining body.

15. A guide rail according to claim 12, wherein the dovetailed connection means are arranged so that they are distributed approximately evenly over the length of the guide rail.

16. A guide rail having bearing lugs that interact with bearing pins of an internal-combustion engine, wherein the bearing lugs are arranged at a carrier of the guide rail and are equipped with fixing devices that engage in a recess of the bearing pins.

17. A guide rail according to claim 16, wherein each fixing device has elastic tightening elements acting in radial direction of the respective bearing pin, said tightening elements being manufactured in one piece with the carrier.

18. A guide rail according to claim 16, wherein the fixing devices are thread bolts that act in radial direction of the bearing pins and engage in their recess by means of a spherical segment.

19. A guide rail according to claim 16, wherein the guide rail is formed by a carrier and a slideway lining body that consists of plastic and is connected with said carrier, and wherein said carrier and said slideway lining body are manufactured of a plastic material of respective different specifications in progressive manufacturing cycles and are connected with one another via at least one meshing arrangement means that reach behind one another.

20. A process for manufacturing a guide rail for the guiding of chains of a control shaft drive of a vehicle internal combustion engine or the like, said guide rail being formed by a carrier and a slideway lining body which are made of different plastic material and are connected to one another by at least one interengaging meshing arrangement means, said process comprising:
producing a carrier by injection molding of a first plastic material;
and subsequently producing a slideway lining body by injection molding of a second plastic material and combining the carrier with the slideway lining body.

21. A process according to claim 20, wherein said guide rail is formed as a duct surrounding the chain at several sides, wherein the slideway lining body is embedded in the carrier, and wherein the meshing arrangement means includes dovetailed connection means extending between the carrier and the slideway lining body transversely to a longitudinal direction of the chain.

* * * * *